(12) United States Patent
Kreet et al.

(10) Patent No.: US 10,257,028 B2
(45) Date of Patent: Apr. 9, 2019

(54) CONFIGURATION SERVICES FOR USER TERMINALS

(71) Applicant: ALE INTERNATIONAL, Colombes (FR)

(72) Inventors: Olivier Kreet, Strasbourg (FR); Sylvain Beaux, Eckbolsheim (FR); Jean-Michel Lauriol, Fegersheim (FR)

(73) Assignee: ALE INTERNATIONAL, Colombes (FR)

( * ) Notice: Subject to any disclaimer, the term of this patent is extended or adjusted under 35 U.S.C. 154(b) by 363 days.

(21) Appl. No.: 15/078,048

(22) Filed: Mar. 23, 2016

(65) Prior Publication Data

US 2016/0285681 A1  Sep. 29, 2016

(30) Foreign Application Priority Data

Mar. 23, 2015  (EP) .................................... 15305418

(51) Int. Cl.
*H04L 12/24* (2006.01)
*G06F 17/30* (2006.01)
*H04L 29/12* (2006.01)

(52) U.S. Cl.
CPC .... *H04L 41/0803* (2013.01); *G06F 17/30312* (2013.01); *G06F 17/30917* (2013.01); *H04L 41/0806* (2013.01); *H04L 61/303* (2013.01)

(58) Field of Classification Search
None
See application file for complete search history.

(56) References Cited

U.S. PATENT DOCUMENTS

2007/0276905 A1  11/2007  Durand et al.
2009/0013062 A1*  1/2009  Blatherwick ....... H04L 67/2861
                                                          709/222

(Continued)

FOREIGN PATENT DOCUMENTS

EP  2770679 A1  8/2014

OTHER PUBLICATIONS

European Search Report with regard to EP15305418 dated Sep. 24, 2015.

*Primary Examiner* — Natisha D Cox
(74) *Attorney, Agent, or Firm* — BCF LLP

(57) ABSTRACT

A system for configuring a user terminal connected to an Internet Protocol network, comprises: a configuration repository (ASN) in a service provider domain, wherein the configuration repository is loaded with configuration information intended for a user terminal, a front-end server in the service provider domain, the front-end server comprising: a communication port connected to the Internet Protocol network, and a first controller arranged for mapping a predefined device identifier to the configuration repository, and a redirection server, the redirection server comprising: a communication port connected to the Internet Protocol network and reachable by a user terminal to be configured, a non-transitory computer-readable medium loaded with a service provider record, wherein the service provider record comprises a fully qualified domain name routable to the front-end server communication port, and a second controller arranged for mapping a predefined service provider identifier to the service provider record.

10 Claims, 3 Drawing Sheets

(56) References Cited

U.S. PATENT DOCUMENTS

| | | | |
|---|---|---|---|
| 2010/0030875 A1* | 2/2010 | Visser | H04L 41/0806 709/220 |
| 2013/0013752 A1* | 1/2013 | Herrera Van Der Nood | H04L 41/0886 709/220 |
| 2014/0373116 A1* | 12/2014 | Hajduczenia | H04L 9/3271 726/6 |
| 2015/0244586 A1* | 8/2015 | Lee | H04L 41/0806 709/223 |

* cited by examiner

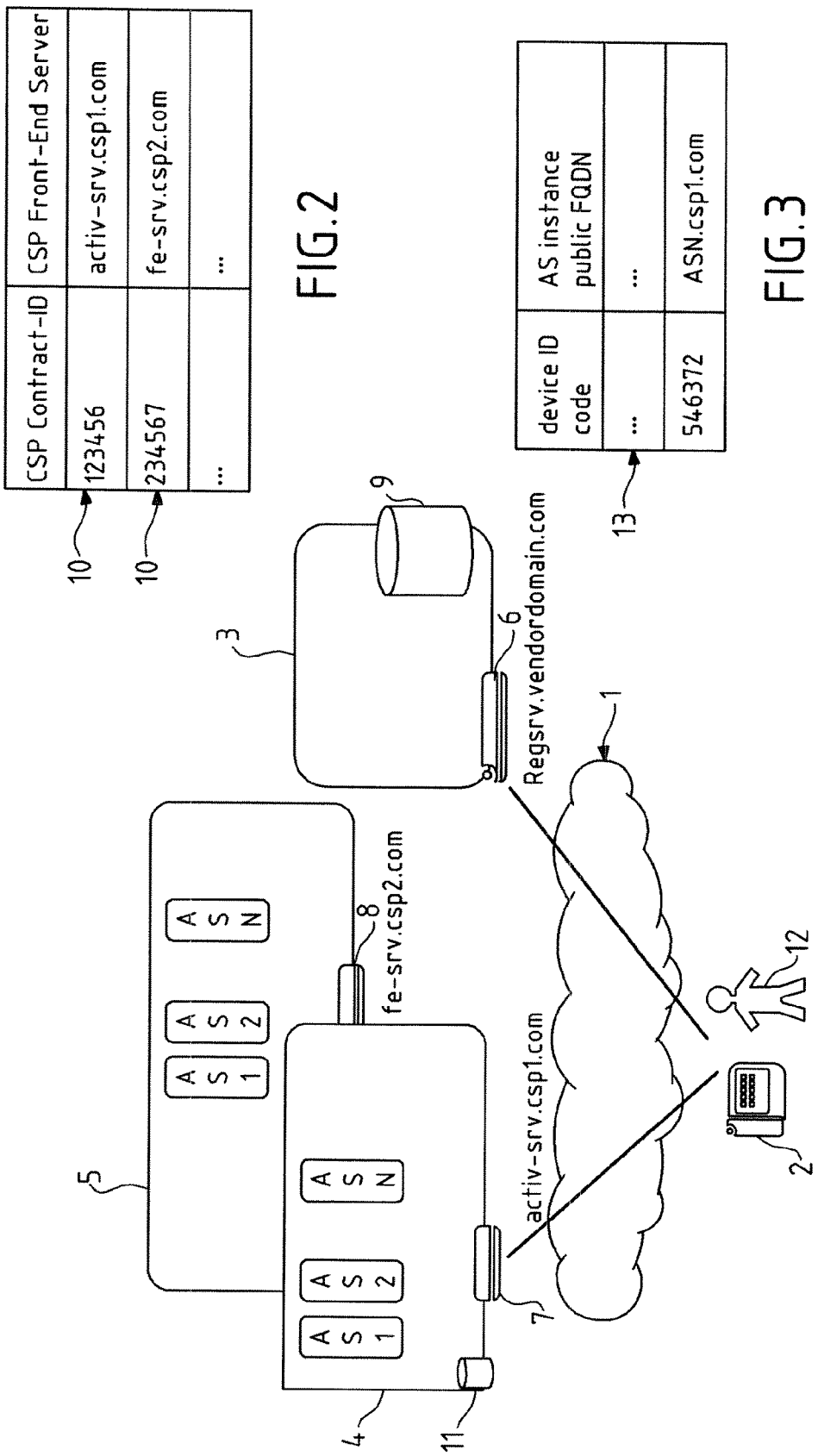

CONFIGURATION SERVICES FOR USER TERMINALS

CROSS-REFERENCE TO RELATED APPLICATION S

This United States Non-Provisional Patent Application claims priority from European Patent Application Serial No. EP 15 30 5418.4, filed on Mar. 23, 2015, the entire content of which is incorporated herein by reference.

FIELD OF THE INVENTION

The invention relates to the field of Internet Protocol (IP) communications, especially to advanced voice-over-IP communication services, and in particular to systems and methods for offering such advanced voice-over-IP communication services through a service provider network that is not owned or controlled by the end users.

BACKGROUND

In the context of Unified Communication offered as a Service, a communication solution is implemented by a Cloud Service Provider (CSP). Basically a Communication solution for corporate environment consists of network equipment such as communication servers (telephony servers) and terminals including softphones (desktop phones, mobile phones) and hardphones (called also deskphones). The communication servers may provide a variety of advanced services. All this network equipment operates together and need to be configured. In case of mass deployment of terminals, the configuration procedure consists of an automatic downloading of a configuration file from a repository server, which may be part of the communication servers or provided separately.

A key point to address in the cloud environment described above relates to enabling the user terminal to learn the Configuration Repository Server address, especially when it is started for the first time in the network environment.

Several existing solutions can be considered for that purpose.

1/A first solution, referred to as Pre-configuration of terminals by the terminal vendor or by the CSP, consists in loading into the terminal the CSP address where the terminal will find its configuration file. This operation is done before the terminal is shipped to the end user. The end user then has to plug the terminal that directly connects to the right CSP address, e.g. a configuration server. Typically, the terminal may require the user to input some identification information so that the device is authorized on the configuration server.

If such pre-configuration is performed by the equipment vendor before terminals are shipped to the CSP or CSP end customers, a specific step has to be implemented by the vendor in the manufacturing process for devices that will be deployed by any CSP. The vendor has to track each CSP business projections to finely manage inventory of devices for each CSP. If such pre-configuration is performed by the CSP, a specific procedure for customizing devices must be implemented by the CSP, requiring financial and human resources for training, logistics and infrastructure.

In summary, this first solution requires costly operations before the terminals can be delivered to the end customer, and highly impacts the operational and logistical expenses for the service provider or equipment vendor.

2/A second solution, referred to as Vendor Central Server Tracking every deployed device, consists in the equipment vendor implementing a central server accessible on the Internet and delivering the configuration for all the vendor's terminals deployed by various customers. However, this solution implies high operational costs for the vendors to maintain the database of all deployed terminals, typically by tracking MAC addresses of all shipped terminals, and to keep customers' related parameters up to date. It also implies that the vendor remains closely involved throughout the service life of terminals. This second solution is deployed by SNOM Technology AG, a company incorporated in Germany.

3/A third solution consists in relying on DHCP, e.g. as disclosed in EP-A2-1418733. Using DHCP to provide the Configuration Repository server URL is a possibility that requires configuring the DHCP server of the network where the terminal will be installed, so that the DHCP server delivers a specific DHCP option containing the server location. However, this solution requires that the user or the CSP has control over the DHCP server of the end user network. Consequently, this is irrelevant for a lot of use cases:

When the user terminal is deployed in a network where the DHCP server is not manageable by the CSP, e.g. the home network of a user.

Not applicable if several terminals of different CSP, or different Application Servers of the same CSP, are deployed on the same network and therefore served by the same DHCP server.

In addition, DHCP servers are complex enough, so that it is typically not acceptable to rely on the end-user to configure DHCP services.

4/A fourth solution consists in Manual configuration. The manual configuration of the Configuration Repository Server URL on the terminal by the end user typically requires highly available helpdesk services, which involve operating costs. Besides, it proves impractical on simple terminals having only a numeric keypad.

US-A-2010030875 discloses a method and system for remote device management. A central auto-configuration server manager accesses a first database which comprises IP address information of manageable electronic devices that are allowed to access the service of auto-configuration server manager, a second database which comprises information that associates the identity of the service provider with the IP address of the manageable electronic device, and a third database which comprises information that associates the IP address of the dedicated auto-configuration server with the IP address of the manageable electronic device or with the identity of the service provider.

SUMMARY

One object of the invention is to provide methods for enabling terminals to easily discover a Cloud Service Provider and a Configuration Server instance to which it must be attached for retrieving configuration information, in particular in a context where a Cloud Service Provider relies on a same equipment vendor for application servers (AS) and communication terminals.

Aspects of the invention provide a configuration service to user terminals in an Internet Protocol network that minimally impacts the manufacturing procedures of terminals implemented by equipment vendors. Aspects of the invention provide a configuration service that does not require a different manufacturing process for terminals intended for cloud deployment (communication solution offered as a service) and on-premises deployment (communication solution fully purchased and installed on customer premises).

Aspects of the invention provide a configuration procedure that can be easily implemented both from the service provider's side and from the end user's side, to allow connecting an "out-of-the-box" terminal to the right Application Server instance in the right CSP network. Aspects of the invention provide a configuration procedure that minimizes interactions between the end user and the CSP helpdesk. Aspects of the invention provide a configuration procedure compatible with terminals having a very basic user interface.

In an embodiment, the invention provides a method for deploying a configuration service for user terminals in an Internet Protocol network, the method comprising:
allocating a device identifier and a service provider identifier to a user terminal to be configured,
providing a configuration repository in a service provider domain connected to the Internet Protocol network, wherein the configuration repository is loaded with configuration information intended for the user terminal,
providing a front-end server in the service provider domain, the front-end server comprising a first controller arranged for mapping the device identifier to the configuration repository,
generating a service provider record in a redirection server connected to the Internet Protocol network, wherein the redirection server is reachable by the user terminal,
wherein the service provider record comprises a network location routable to the front-end server, e.g. fully qualified domain name or domain name for use with SRV requests, wherein the redirection server comprises a second controller arranged for mapping the service provider identifier to the service provider record.

Thanks to these features, an entity such as a service provider may create a network environment that facilitates initial configuration a user terminal by a new subscriber without getting closely involved in the shipment of the user terminal to the new subscriber. In particular, the device identifier may be selected at will by the entity and does not have to be identical to a number allocated to the equipment in the manufacturing process, such as a MAC address.

According to embodiments, such method may comprise one or more of the features below.

In an embodiment, the method further comprises:
communicating the device identifier and service provider identifier to an intended user of the user terminal, for enabling the intended user to enter the device identifier and service provider identifier into the user terminal.

The device identifier and service provider may be provide a various formats, e.g. as a string of alphanumerical characters. In an embodiment, the device identifier and service provider identifier are sequences of digits. In an embodiment, the device identifier and service provider identifier are two predefined portions of a single sequence of digits.

In an embodiment, the method further comprises:
receiving, by the front-end server in the service provider domain, a request for configuration originating from a source IP address, the request for configuration comprising the device identifier,
retrieving, by the front-end server, a network address for the configuration repository to which the device identifier is mapped,
returning, by the front-end server, the configuration information intended for the user terminal to the source IP address of the request for configuration.

In an embodiment, the method further comprises:
providing a configuration server in the service provider domain, wherein the configuration server includes the configuration repository, wherein the network address for the configuration repository comprises a fully qualified domain name of the configuration server, and
operating the front-end server as a proxy server, e.g. a reverse-proxy, to relay the request for configuration to the configuration server,
retrieving the configuration information by the configuration server as a function of the device identifier,
and operating the front-end server as a proxy server, e.g. a reverse-proxy, to relay the configuration information from the configuration server to the source IP address of the request for configuration.

In an embodiment, the network address for the configuration repository comprises a public fully qualified domain name (FQDN) of the configuration server, the method further comprising:
returning, by the front-end server, the public FQDN of the configuration server to the source IP address of the request for configuration.

In an embodiment, the request for configuration further comprises a MAC address of the user terminal to be configured, the method further comprising:
storing the MAC address by the configuration server and storing an association between the MAC address and the configuration information by the configuration server.

In an embodiment, the method further comprises:
authenticating, by the front-end server, a source of the request for configuration to ascertain that the request for configuration originates from an authorized user terminal.

In an embodiment, the method further comprises:
receiving, by the redirection server, a request for redirection originating from a source IP address, the request for redirection comprising the service provider identifier,
returning, by the redirection server, the network location routable to the front-end server, e.g. fully qualified domain name or domain name for use with SRV requests, to the source IP address of the request for redirection.

In an embodiment, the invention also provides a system for configuring a user terminal connected to an Internet Protocol network, the system comprising:
a configuration repository in a service provider domain, wherein the configuration repository is loaded with configuration information intended for a user terminal,
a front-end server in the service provider domain, the front-end server comprising:
a communication port connected to the Internet Protocol network, and
a first controller arranged for mapping a predefined device identifier to the configuration repository, and
a redirection server, the redirection server comprising:
a communication port connected to the Internet Protocol network and reachable by a user terminal to be configured,
a non-transitory computer-readable medium loaded with a service provider record, wherein the service provider record comprises a network location routable to the front-end server communication port, e.g. fully qualified domain name or domain name for use with SRV requests and
a second controller arranged for mapping a predefined service provider identifier to the service provider record.

In an embodiment, the system further comprises:
a configuration server in the service provider domain, wherein the configuration server includes the configuration repository, wherein the configuration server comprises a third controller arranged for retrieving the configuration information in response to receiving the predefined device identifier, wherein the front-end server is configured as a reverse-proxy to relay a request for configuration received from the Internet Protocol network to the configuration server and to relay the configuration information from the configuration server to a source IP address of the request for configuration.

In an embodiment, the invention also provides a user terminal for voice-over-IP communications, comprising:

an IP communication interface for communicating with an IP network, a non-transitory computer-readable medium loaded with a network location routable to a redirection server, e.g. fully qualified domain name or domain name for use with SRV requests a user interface arranged for inputting a device identifier and a service provider identifier, and a fourth controller arranged for:
   generating a request for redirection comprising the service provider identifier and sending the request for redirection to a fully qualified domain name of the redirection server,
   parsing a redirection response received from the redirection server for detecting a network location routable to a front-end server of a service provider, e.g. fully qualified domain name or domain name for use with SRV requests,
   generating a request for configuration comprising the device identifier and sending the request for configuration to the network location detected, and
   parsing a configuration response received from the front-end server for detecting configuration information.

According to embodiments, such user terminal may comprise one or more of the features below.

In an embodiment, the fourth controller is further arranged for:
   parsing a redirection response received from the front-end server for detecting a public fully qualified domain name routable to a configuration server of the service provider,
   generating a second request for configuration comprising the device identifier and sending the second request for configuration to the public fully qualified domain name detected, and
   storing the public fully qualified domain name detected in the non-transitory computer-readable medium.

In an embodiment, the user terminal further comprises:
a digital certificate stored in the non-transitory computer-readable medium, and an authentication module arranged for accessing the digital certificate to allow authenticating the user terminal by at least one of the redirection server and front-end server. For example, the digital certificate is owned by the equipment vendor or manufacturer.

BRIEF DESCRIPTION OF THE DRAWINGS

These and other aspects of the invention will be apparent from and elucidated with reference to the embodiments described hereinafter, by way of example, with reference to the drawings.

FIG. 1 illustrates a network infrastructure suitable for advanced voice-over-IP communications, in which embodiments of the invention can be employed.

FIG. 2 illustrates a look-up table that can be employed in a redirection server of FIG. 1.

FIG. 3 illustrates a look-up table that can be employed in a front-end server of FIG. 1.

DETAILED DESCRIPTION OF THE EMBODIMENTS

Figure 4:
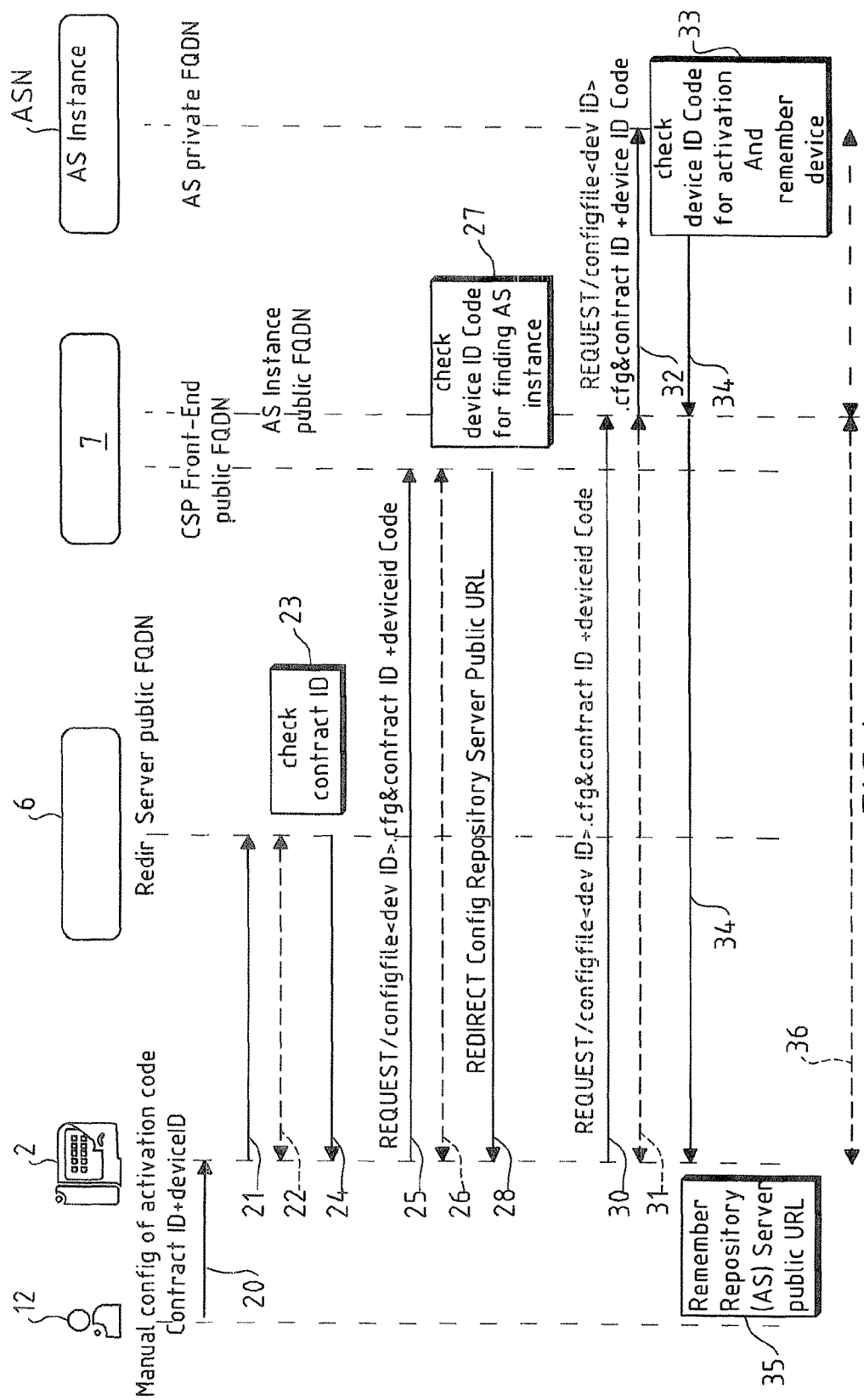
FIG. 4 is a call-flow diagram illustrating a terminal configuration method in accordance with a first embodiment.

FIG. 1 illustrates a network infrastructure comprising an IP network 1, e.g. a public network, which provides IP connectivity between a user terminal 2, a vendor domain 3 and CSP domains 4 and 5. The vendor domain 3 comprises a redirection server 6. The CSP domain 4 comprises a front-end server 7 and a plurality of application servers AS1, AS2, ASN, where N represents a certain positive number. The CSP domain 5 may be arranged similarly, although it has of course different network addresses from the CSP domain 4.

Such infrastructure can be applied to a Unified Communication as a service commercial model, in which an equipment vendor provides a Communication solution with terminals and servers and does business with several Cloud Service providers who will host this solution in their own domain for selling Unified Communication services to end customers.

A terminal deployment procedure having the following features is implemented in this network infrastructure.

A redirection service, which is operated by the vendor domain 3 in the illustrated embodiment, is implemented so as to be reachable on the public Internet. This redirection service is common to all telephones commercialized by the vendor. Therefore, all telephones are loaded with its network location at built time. Such network location can be provided as a FQDN directly or as a Domain Name System (DNS) domain, on which the terminal will be able to send a SRV request to obtain the FQDN in a DNS response.

Therefore, no device configuration is further needed to enable the telephone to reach this redirection service. This redirection service maps a unique CSP identity, illustrated by the left-hand column of FIG. 2, to a network location (FQDN or DNS domain) resolving to a Front-End Server in the network of this CSP, illustrated by the right-hand column of FIG. 2. This mapping illustrated by FIG. 2 allows telephones to easily discover the CSP domain to which they will be attached, taking as an input an activation code, e.g. a sequence of digits, which the end-user has to enter once in the initial deployment process.

At the CSP Front-End server 7 or 8, a Configuration Repository Server lookup service is implemented. The lookup service maps the telephone to the final configuration server, e.g. in the context where the CSP operates several instances of the communication solution and each instance hosts the configuration files of a subset of the telephones operated by the CSP. This lookup service is based on the activation code that the user entered on the telephone at first installation.

The end user is provided with an activation code by the CSP. The activation code comprises a first portion that identifies the CSP, referred to as contract ID in the following, and a second portion referred to as Device Identification Code or Device ID in the following. Namely, the activation code is made of two portions: the CSP identity enabling localizing the CSP, and the device identification code for localizing the Configuration Repository Server by this CSP. This activation code may consist only of simple characters, typically all digits, so it can be easily entered on any communication device interface. Preferably, the user has to provide this code once during the lifecycle of the telephone.

Telephone 2 offers a simple interface for entering the activation code. This interface will typically be displayed to the user through a dedicated menu, e.g. named "Cloud registration", or automatically after failure to start with more generic ways typically applied for on-premises deployments, such as DHCP.

The terminal deployment procedure includes one initialization step for each CSP, namely registering the CSP Identifier, i.e. the contract—ID, into the vendor redirection server 6, e.g. through some out-of-band or automatic communication. FIG. 2 illustrates an embodiment of a look-up table that is stored in data storage 9 attached to the redirection server 6 and containing one record 10 for each CSP participating in the service. Each record 10 comprises the CSP contract-ID, that will be communicated to clients for initializing the terminal configuration procedure, and the corresponding front-end server FQDN, that may be retrieved automatically from the look-up table by the redirection server 6 in response to receiving a request for redirection containing the contract-ID.

In an embodiment, the vendor domain 3 includes a network management system of web portal that enables the CSPs to create the CSP records 10. A network management system can be a hardware device, for example a personal computer, a workstation, an Internet appliance, or other general purpose or specific purpose communications device. A software program running on this system performs network management functions to control the network elements.

Three main steps are performed for installing the telephone of a new subscriber to the CSP service:
 (i) The CSP 4 creates a record for the new subscriber in its datacenter and builds the activation code comprising CSP Identifier and Device Identification Code for the new subscriber. The CSP configures this activation code in the Application Server to which the user terminal of the new subscriber will be attached, e.g. ASN, and in the Front-End Server 7 that will need to relay configuration requests to this Application Server. The CSP 4 also sends the activation code to the end user 12 through out of band methods (mail, SMS, Web-Page).
 (ii) The user 12 starts the user terminal 2, navigates to the configuration menu and enters the activation code, causing the device to automatically query the Vendor Redirection Server 6 for finding the CSP.
 (iii) the user terminal 2 queries the CSP Front-End server 7 obtained at the previous step, which in turn locates the final Configuration Repository server, e.g. ASN.

Step (iii) causes the user terminal 2 to download the configuration file from the CSP domain 4, and the Application Server ASN registering the user terminal 2 by some unique application-dependent identifier, e.g. its MAC address that is then used for further startup dialogs between the user terminal 2 and the Application Server ASN. Subsequent connections and queries for configuration files therefore may not require going through the full cycle described above.

FIG. 3 illustrates an embodiment of a look-up table that is stored in data storage 11 attached to the front-end server 7 and containing one record 13 for each user subscribing to the communications service of CSP domain 4. Each record 13 comprises the Device Identification Code that will be communicated to the subscriber for initializing the terminal configuration procedure, and the corresponding Application server FQDN that may be retrieved automatically from the look-up table by the front-end server 7 in response to receiving a request for configuration containing the Device ID.

Turning now to FIG. 4, a more detailed call flow embodying the above principles will be described. The protocol used for the communication between the user terminal 2, the redirection server 6, the CSP front-end server and the application server ASN can be HTTPS. TLS can be used as mutual authentication method.

The network topology in which the flows of FIG. 4 are implemented is depicted in FIG. 1. It is assumed for the sake of illustration that two CSPs are registered with the vendor redirection service, as illustrated by CSP domain 4 and CSP domain 5.

Each CSP domain may implement several instances of the application servers, typically to offer dedicated instances per end-user or to address scalability. Each application server builds and hosts the configuration files for a subset of the user terminals registered to the CSP domain and serves as the Configuration Repository server for those user terminals. The correlation between a user terminal to be configured and the corresponding application server is initially configured into the data storage 11 attached to the front-end server 7.

The flow chart of FIG. 4 will be described in relation to a new subscriber of CSP domain 4. Therefore the CSP Identifier that was communicated to the user 12 is: 123456 (see FIG. 2). Further, it is assumed that the Device Identification Code that was communicated to the user 12 is: 546372 (see FIG. 3). For example, both identifiers were communicated as a single string of digits to the end-user, i.e. 123456546372.

The front-end Server 7 exposes a set of reachable addresses (FQDN):
 The public FQDN for the Front-end Server (e.g. active-srv.csp1.com in FIG. 1), which is the initial entry point in the CSP network for new user terminals and which is preconfigured in the redirection server 6.
 One public FQDN for each backend Application Server AS1, AS2, . . . ASN, that the front-end server 7 is able to map to a corresponding private address of the Application Server where the Configuration Repository Server and Application of this Application Server can be reached.

At step 20, the user 12 manually enters the activation code 123456546372 into a user interface of the terminal 2.

At step 21, the terminal 2 sends a request for redirection to a public FQDN of the redirection server 6, which was loaded into the terminal during the manufacturing phase. The request for redirection includes both the CSP Identifier and the Device Identification Code.

Preferably, mutual authentication is performed at step 22 between the terminal 2 and the redirection server 6.

At step 23, the redirection server 6 checks the CSP Identifier received in the request for redirection and retrieves the matching front-end server public FQDN from the look-up table of FIG. 2.

At step 24, the redirection server 6 returns the front-end server FQDN to the terminal 2, e.g. to the source IP address of the request for redirection.

At step 25, the terminal 2 sends a request for configuration to the front-end server public FQDN, which was received at step 24. The request for configuration includes both the CSP Identifier and the Device Identification Code, and preferably also a hardware identifier of the terminal 2 denoted <devID> in FIG. 4. The hardware identifier <devID> is typically a MAC address and may be employed as a file name for the configuration file.

Preferably, mutual authentication is performed at step 26 between the terminal 2 and the front-end server 7.

At step 27, the front-end server 7 checks the device Identification Code received in the request for configuration and retrieves the matching application server public FQDN from the look-up table of FIG. 3, e.g. application server ASN.

At step 28, the front-end server 7 returns the application server public FQDN to the terminal 2, e.g. to the source IP address of the request for redirection.

At step 30, the terminal 2 re-sends the request for configuration to the application server public FQDN. The front-end server 7 is operating as a reverse-proxy for the application servers. Preferably, mutual authentication is performed at step 31 between the terminal 2 and the front-end server 7. Then, at step 32, the front-end server 7 maps the application server public FQDN to a corresponding private FQDN and forwards the request for configuration to the application server private FQDN.

At step 33, the application server ASN checks the device Identification Code received in the request for configuration and retrieves the matching configuration information, e.g. consisting of one or more configuration files.

At step 34, the application server ASN returns the one or more configuration files to the terminal 2 through the front-end server 7 operating as a reverse-proxy. In addition, the application server ASN saves the data received in the request for configuration, such as the MAC address. This avoids sending the activation code again on subsequent terminal startups.

At step 35, the terminal 2 preferably saves the application server public FQDN to be able to send further configuration requests directly without interrogating the front-end server public FQDN.

At step 36, the terminal 2 employs the configuration file received in order to configure software modules in charge of communication services and establishes applicative flows with the application server ASN, to which the terminal 2 is attached.

During subsequent startups of the terminal 2, the process will have to go only through steps 30 to 36. Indeed, since the CSP Front-End Server 7 has looked up the Config Repository server address once and notified the public FQDN of the Application server ASN to the terminal 2, the terminal 2 is able to interact directly with the application server ASN. This scenario allows offloading the Front-End Lookup Service and avoids sending the activation code on subsequent device startups.

Figure 5:
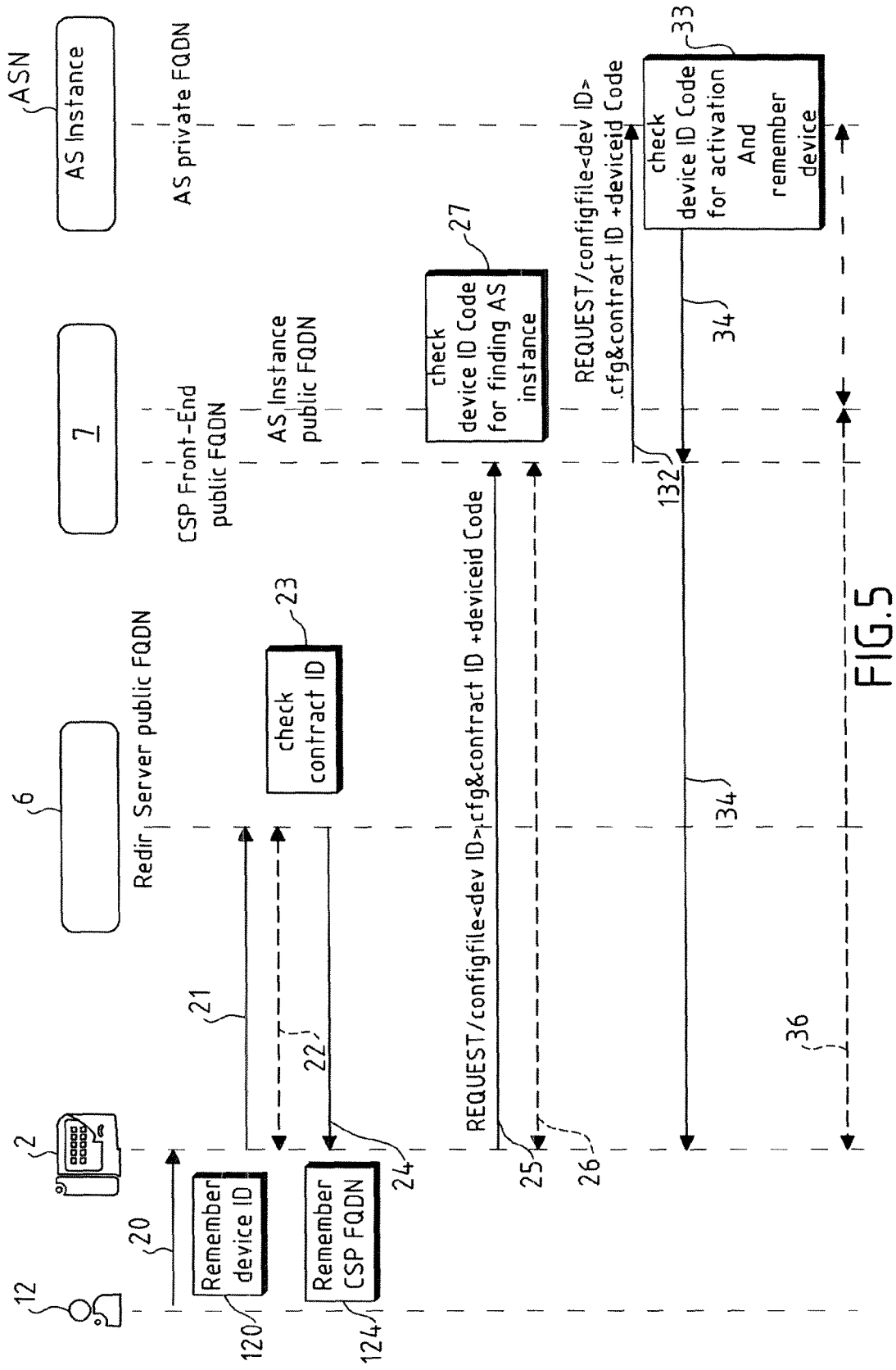
FIG. 5 is a call-flow diagram illustrating a terminal configuration method in accordance with a second embodiment.

With the scenario of FIG. 4, the CSP cannot easily move the terminal 2 attachment to another application server. FIG. 5 illustrates an alternative call flow, in which the CSP Front-End Server 7 remains in the loop of all startups of terminals for step (iii) consisting of configuration file retrieval. Steps identical or similar to those of FIG. 4 are designated by the same numeral and will not be described again.

At step 120, the terminal 2 stores the device identification code entered by the user 12, so that it can be easily re-used for further configuration requests 25 at subsequent terminal startups.

At step 124, the terminal 2 stores the public FQDN of front-end server 7 that was returned by the redirection server 6, so that it can be easily re-used for further configuration requests 25 at subsequent terminal startups.

At step 27, the front-end server 7 does not return a network address of the application server to the terminal 2. Instead, the front-end server 7 directly reverse-proxies the configuration request 25 and forwards it, at step 132, to the application server mapped to the device identification code received.

This alternative call flow allows the CSP to move more easily the terminal attachment to another application server at a later time, because the application server attachment is not remembered by the terminal itself and is always retrieved by the terminal 2 from the front-end server 7.

The configuration information that may be distributed by the above-described methods encompasses any information involved in configuring communication services. This includes for example, calling number of the terminal 2, user name of subscriber 12, call routing profiles, call forwarding options, bookmarks, bootstraps toward telephony servers, contact sharing options, security options such as user rights, SNTP (for Simple Network Time Protocol) server address for clock synchronization, network location of redundant application servers for remediation of server outage, network layer data such a network locations of DNS and proxies, VLAN identifiers, local settings relating to terminal 2 user experience such as display formats, user interface language, log size, screensavers, PC synchronization options, options relating to the operating mode of peripherals, e.g. camera options, ambient light sensor options, Bluetooth options, and the like.

The configuration information may include confidential information intended for the sole user, e.g. such as SIP passwords and identifiers. Therefore, mutual authentication between the terminal and the servers at each step improves security and reduces the risk of distributing the configuration information to a third party. Authentication may be performed with a digital certificate installed by the equipment manufacturer in the terminal during the manufacturing phase. Therefore, the terminal may be shipped directly to the end user by the equipment vendor without any direct intervention by the service provider, neither on the hardware nor on the software of the terminal.

The communication services implemented by the application servers may encompass telephony services such as call routing as a function of predefined routing profiles, voice mail services, call filtering, call supervision, distant call pickup, conferencing services including video and/or audio, document sharing, instant messaging, user presence information and the like.

The above-described embodiments rely on the same servers, referred to as application servers, for both hosting the configuration repositories and implementing the communication services. In other words, a configuration server is collocated with an application server. In an alternative embodiment, different servers could be employed, i.e. non collocated, namely one or more dedicated configuration repository servers for hosting the configuration repositories and one or more separate application servers for implementing the advanced communication services. For the purpose of distributing the configuration information, it is sufficient that the terminal gains access to the configuration repository server. The network locations of the further application servers may be included within the configuration information that terminal obtains from the configuration repository server. In such case, the applicative flows of step 36 will be exchanged between the terminal and the separate application server. Therefore, the phrase "configuration server" in the claims is intended to encompass any server hosting the configuration repositories, which may or may not serve also an application server for communication services.

The above-described embodiments rely on FQDNs delivered by the redirection server for the terminal to identify the front-end server. In an alternative embodiment, the front-end server FQDN may be identified as an SRV record in the domain name system. Therefore, instead of providing directly the FQDN, the redirection server may provide a domain name to be queried by the terminal to retrieve the front-end server FQDN.

Elements such as the control means, controllers (e.g., the first controller, the second controller, the third controller and/or the fourth controller) and electronic devices could be e.g. hardware means like e.g. an ASIC, or a combination of hardware and software means, e.g. an ASIC and an FPGA, or at least one microprocessor and at least one memory with software modules located therein. In some embodiments, the first controller, the second controller, the third controller and/or the fourth controller may be embodied so as to implement control logic through hardware and/or software. Therefore, the invention may be implemented by means of hardware as well as software.

In the context of the present specification, unless expressly provided otherwise, the words, "first", "second", "third", "fourth", etc. have been used as adjectives only for the purpose of allowing for distinction between the nouns that they modify from one another and not for the purpose of describing any particular relationship between those nouns. Thus, for example, it should be understood that, the use of the terms "first controller", "second controller", "third controller", "fourth controller" is not intended to imply any particular order, type, chronology, hierarchy or ranking (for example) of/between the controller, nor is their use (by itself) intended imply that any one of the "first controller", "second controller", "third controller", "fourth controller" must necessarily exist in any given situation. Further, as is discussed herein in other contexts, reference to a "first controller" and a "third controller" does not preclude the two controllers from being the same actual real-world element. Thus, for example, in some instances, a "first controller" and a "second controller" may be the same hardware and/or software, in other cases they may be different hardware and/or software.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

The invention claimed is:

1. A method for deploying a configuration service for user terminals in an Internet Protocol (IP) network, the method comprising:
   allocating a device identifier and a service provider identifier to a user terminal to be configured,
   providing a configuration repository (ASN) connected to the IP network, wherein the configuration repository is loaded with configuration information intended for the user terminal,
   providing a front-end server comprising a first controller arranged for mapping the device identifier to the configuration repository,
   wherein the front-end server and the configuration repository (ASN) are provided in a same service provider domain, wherein the service provider domain is defined in a Domain Name System,
   the method further comprising:
      generating a service provider record in a redirection server connected to the IP network, wherein the redirection server is reachable by the user terminal, wherein the service provider record comprises a network location routable to the front-end server, the front-end server being distinct from the redirection server, wherein the redirection server comprises a second controller arranged for mapping the service provider identifier to the service provider record,
      receiving, by the redirection server, a request for redirection originating from a source IP address, the request for redirection comprising the service provider identifier,
      returning, by the redirection server, the network location routable to the front-end server to the source IP address of the request for redirection,
      receiving, by the front-end server in the service provider domain, a request for configuration originating from a source IP address, the request for configuration comprising the device identifier,
      retrieving, by the front-end server, a network address for the configuration repository (ASN) to which the device identifier is mapped, and
      returning, by the front-end server, the configuration information intended for the user terminal to the source IP address of the request for configuration.

2. The method of claim 1, further comprising:
communicating the device identifier and service provider identifier to an intended user of the user terminal, for enabling the intended user to enter the device identifier and service provider identifier into the user terminal.

3. The method of claim 1, wherein the device identifier and service provider identifier are sequences of digits.

4. The method of claim 1, wherein the device identifier and service provider identifier are two predefined portions of a single sequence of digits.

5. The method of claim 1, further comprising:
providing a configuration server (ASN) in the service provider domain, wherein the configuration server includes the configuration repository, wherein the network address for the configuration repository comprises a fully qualified domain name of the configuration server,
operating the front-end server as a reverse-proxy to relay the request for configuration to the configuration server (ASN),
retrieving the configuration information by the configuration server as a function of the device identifier, and
operating the front-end server as a reverse-proxy to relay the configuration information from the configuration server to the source IP address of the request for configuration.

6. The method of claim 5, wherein the network address for the configuration repository comprises a public FQDN of the configuration server, the method further comprising:
returning, by the front-end server, the public FQDN of the configuration server to the source IP address of the request for configuration.

7. The method of claim 6, wherein the request for configuration further comprises a MAC address of the user terminal to be configured, the method further comprising:
   storing the MAC address by the configuration server (ASN) and storing an association between the MAC address and the configuration information by the configuration server.

8. The method of claim 1, further comprising:
   authenticating, by the front-end server, a source of the request for configuration to ascertain that the request for configuration originates from an authorized user terminal.

9. A system for configuring a user terminal connected to an Internet Protocol (IP) network, the system comprising:
   a configuration repository (ASN) loaded with configuration information intended for a user terminal,
   a front-end server comprising:
      a communication port connected to the IP network, and
      a first controller arranged for mapping a predefined device identifier to the configuration repository, and
   a Domain Name System defining a service provider domain, the front-end server and configuration repository (ASN) being provided in the service provider domain,
   wherein the front-end server is configured to: receive a request for configuration originating from a source IP address, the request for configuration comprising the device identifier,
   retrieve a network address for the configuration repository (ASN) to which the device identifier is mapped, and
   return the configuration information intended for the user terminal to the source IP address of the request for configuration,
   and wherein the front-end server and the configuration repository (ASN) are provided in a same service provider domain, and
   a redirection server distinct from the front-end server, the redirection server comprising:
      a communication port connected to the IP network and reachable by a user terminal to be configured,
      a non-transitory computer-readable medium loaded with a service provider record, wherein the service provider record comprises a network location routable to the front-end server communication port, and
      a second controller arranged for mapping a predefined service provider identifier to the service provider record,
   wherein the redirection server is configured to:
      receive a request for redirection originating from a source IP address, the request for redirection comprising the service provider identifier, and
      return the network location routable to the front-end server to the source IP address of the request for redirection.

10. The system of claim 9, further comprising:
   a configuration server (ASN) in the service provider domain, wherein the configuration server includes the configuration repository, wherein the configuration server comprises a third controller arranged for retrieving the configuration information in response to receiving the predefined device identifier,
   wherein the front-end server is configured as a reverse-proxy to relay a request for configuration received from the IP network to the configuration server and to relay the configuration information from the configuration server to a source IP address of the request for configuration.

* * * * *